United States Patent
Xu

(10) Patent No.: US 12,455,498 B2
(45) Date of Patent: Oct. 28, 2025

(54) PHOTOGRAPHING APPARATUS, ELECTRONIC DEVICE, AND CONTROL METHOD OF PHOTOGRAPHING APPARATUS

(71) Applicant: VIVO MOBILE COMMUNICATION CO., LTD., Guangdong (CN)

(72) Inventor: Nenghua Xu, Guangdong (CN)

(73) Assignee: VIVO MOBILE COMMUNICATION CO., LTD., Guangdong (CN)

( * ) Notice: Subject to any disclaimer, the term of this patent is extended or adjusted under 35 U.S.C. 154(b) by 140 days.

(21) Appl. No.: 17/993,513

(22) Filed: Nov. 23, 2022

(65) Prior Publication Data

US 2023/0092048 A1 Mar. 23, 2023

Related U.S. Application Data

(63) Continuation of application No. PCT/CN2021/095476, filed on May 24, 2021.

(30) Foreign Application Priority Data

May 27, 2020 (CN) .......................... 202010460991.7

(51) Int. Cl.
G03B 17/56 (2021.01)
(52) U.S. Cl.
CPC ................... *G03B 17/561* (2013.01)
(58) Field of Classification Search
CPC ............................ G03B 17/561; H04N 23/54
See application file for complete search history.

(56) References Cited

U.S. PATENT DOCUMENTS

2009/0295978 A1  12/2009  Yun
2017/0371232 A1  12/2017  Wu et al.
(Continued)

FOREIGN PATENT DOCUMENTS

CN  105472219 A  4/2016
CN  106791289 A  5/2017
(Continued)

OTHER PUBLICATIONS

First Office Action for Japanese Application No. 2022-572793, dated Dec. 18, 2023, 3 Pages.
(Continued)

*Primary Examiner* — Minh Q Phan
(74) *Attorney, Agent, or Firm* — BROOKS KUSHMAN P.C.

(57) ABSTRACT

Photographing apparatus, electronic device and control method of photographing apparatus are provided. The photographing apparatus includes: a base, a lens module mounted on the base, a photosensitive chip module mounted on the lens module, and a driving module separately connected to the base and the photosensitive chip module; the lens module is fixedly arranged relative to the base, and includes a lens body; the photosensitive chip module is located on a side of the lens body that is close to the base, the photosensitive chip module is movable within a first plane, and the first plane is parallel to the lens body; and the driving module is an electromagnetic driving module, the driving module is electrically connected to the photosensitive chip module, and the driving module drives the photosensitive chip module to move within the first plane for anti-shake.

19 Claims, 13 Drawing Sheets

(56) References Cited

U.S. PATENT DOCUMENTS

2018/0352127 A1* 12/2018 Wang .................... H04N 23/54
2020/0120242 A1    4/2020 Wade

FOREIGN PATENT DOCUMENTS

| CN | 109061979 A    |   | 12/2018 |
|----|----------------|---|---------|
| CN | 109618080 A    |   | 4/2019  |
| CN | 209151244 U    | * | 7/2019  |
| CN | 209787281 U    |   | 12/2019 |
| CN | 110650281 A    |   | 1/2020  |
| CN | 111654603 A    |   | 9/2020  |
| JP | 2014092650 A   |   | 5/2014  |
| JP | 2015018268 A   |   | 1/2015  |
| JP | 2019145929 A   |   | 8/2019  |
| JP | 2020060726 A   |   | 4/2020  |
| KR | 20090124318 A  |   | 12/2009 |

OTHER PUBLICATIONS

First Office Action for Chinese Application No. 202010460991.7, dated Apr. 6, 2021, 9 Pages.
International Search Report and Written Opinion for Application No. PCT/CN2021/095476, dated Aug. 19, 2021, 10 Pages.
First Office Action for Korean Application No. 10-2022-7045538, dated Sep. 30, 2024, 6 Pages.

* cited by examiner

PHOTOGRAPHING APPARATUS, ELECTRONIC DEVICE, AND CONTROL METHOD OF PHOTOGRAPHING APPARATUS

CROSS-REFERENCE TO RELATED APPLICATIONS

This application is a continuation of PCT International Application No. PCT/CN2021/095476 filed on May 24, 2021, which claims priority to Chinese Patent Application No. 202010460991.7 filed on May 27, 2020, which are incorporated herein by reference in their entireties.

TECHNICAL FIELD

This application relates to the field of anti-shake technologies, and in particular, to a photographing apparatus and a control method of a photographing apparatus.

BACKGROUND

In a case of taking a picture with a handheld electronic device, the shaking of the hand may cause a slight tilt of the electronic device (usually within +/−0.5 degrees), and the tilt may cause a change in the viewing angle of the camera lens, so that the image is always in an unstable state as the shaking of the hand. In most of the current anti-shake solutions, the lens is used for anti-shake, which has a complex structure and small force.

SUMMARY

To resolve the foregoing technical problem, this application is implemented as follows:

According to a first aspect, an embodiment of this application provides a photographing apparatus, including:
  a base;
  a lens module, where the lens module is mounted on the base, the lens module is fixedly arranged relative to the base, and the lens module includes a lens body;
  a photosensitive chip module, where the photosensitive chip module is mounted on the lens module, the photosensitive chip module is located on a side of the lens body that is close to the base, the photosensitive chip module is movable within a first plane, and the first plane is parallel to the lens body; and
  a driving module, where the driving module is separately connected to the base and the photosensitive chip module, the driving module is an electromagnetic driving module, the driving module is electrically connected to the photosensitive chip module, and the driving module drives the photosensitive chip module to move within the first plane for anti-shake.

According to a second aspect, an embodiment of this application provides an electronic device, including the photographing apparatus described in the first aspect.

According to a third aspect, an embodiment of this application provides a control method of a photographing apparatus, applied to the photographing apparatus described in the first aspect, and the method includes:
  receiving an input of a user; and
  driving, by the driving module in response to the input, the photosensitive chip module to move within the first plane for anti-shake.

According to a fourth aspect, an embodiment of this application provides a photographing apparatus, including: a receiving module, configured to receive an input of a user; and a driving module, configured to drive, in response to the input, the photosensitive chip module to move within the first plane for anti-shake.

According to a fifth aspect, an embodiment of this application provides an electronic device, where the electronic device includes a processor, a memory, and a program or an instruction stored in the memory and executable on the processor, and when the program or the instruction is executed by the processor, steps of the control method of a photographing apparatus according to the third aspect are implemented.

According to a sixth aspect, an embodiment of this application provides a readable storage medium, where the readable storage medium stores a program or an instruction, and when the program or the instruction is executed by the processor, steps of the control method of a photographing apparatus according to the third aspect are implemented.

According to a seventh aspect, an embodiment of this application provides a chip, where the chip includes a processor and a communications interface, the communications interface is coupled to the processor, and the processor is configured to run a program or an instruction, to implement the control method of a photographing apparatus according to the third aspect.

According to an eighth aspect, an embodiment of this application provides a computer software product, where the computer software product is stored in a non-volatile storage medium, and the software product is configured to be executed by at least one processor to implement steps of the control method of a photographing apparatus according to the third aspect.

According to a ninth aspect, an embodiment of this application provides a photographing apparatus, where the photographing apparatus is configured to implement the control method according to the third aspect.

BRIEF DESCRIPTION OF DRAWINGS

The accompanying drawings illustrated herein are provided to further understand this application and form a part of this application. The exemplary embodiments of this application and the descriptions thereof are used to explain this application and do not constitute an improper limitation on this application. In the accompanying drawings.

DETAILED DESCRIPTION

Figure 1:
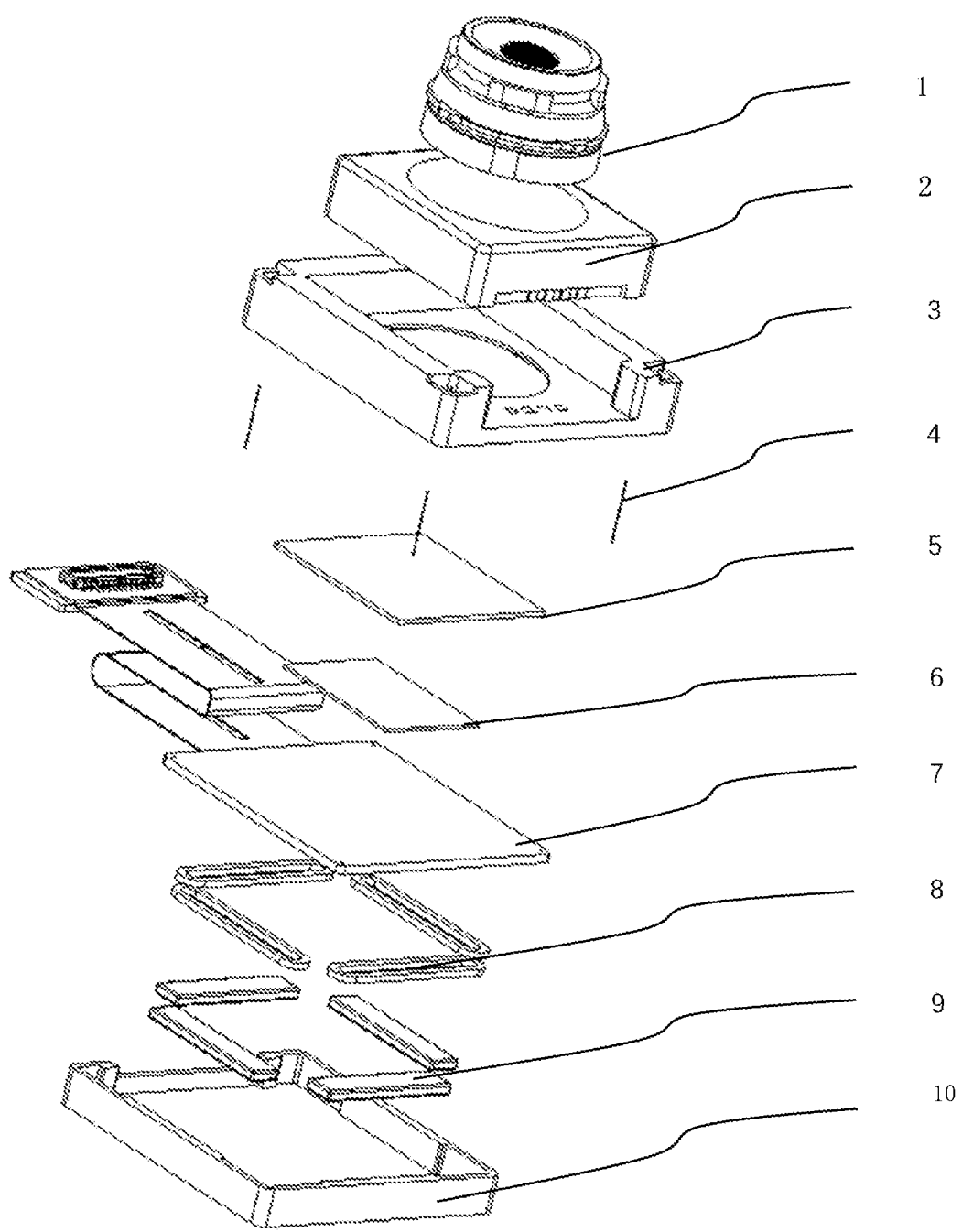
FIG. 1 is an exploded diagram of a photographing apparatus according to an embodiment of this application.

The following clearly describes the technical solutions in the embodiments of this application with reference to the accompanying drawings in the embodiments of this application. Apparently, the described embodiments are some but not all of the embodiments of this application. All other embodiments obtained by a person of ordinary skill in the art based on the embodiments of this application without creative efforts shall fall within the protection scope of this application.

The terms "first", "second", and the like in this specification and claims of this application are used to distinguish between similar objects instead of describing a specific order or sequence. It should be understood that the data used in this way is interchangeable in appropriate circumstances, so that the embodiments of this application can be implemented in other orders than the order illustrated or described herein. In addition, objects distinguished by "first", "second", and the like usually belong to one type, and the number of the objects is not limited. For example, there may be one or more first objects. In addition, "and/or" in the specification and claims represents at least one of connected objects. Symbol "/" in this specification generally represents an "or" relationship between associated objects.

The following specifically describes the photographing apparatus provided in the embodiments of this application through specific embodiments and application scenarios thereof with reference to the accompanying drawings.

As shown in FIG. 1 to FIG. 18, an embodiment of this application provides a photographing apparatus, including: a base 10, a lens module, a photosensitive chip module, and a driving module;

the lens module is mounted on the base 10, and the lens module is fixedly arranged relative to the base 10. The lens module includes a lens body 1, and the lens body 1 is an optical component including one or more cambered (usually spherical) optical glass or plastic parts, used to transmit light, can receive optical signals, and collect the optical signals in the photosensitive chip module; and the photosensitive chip module is mounted on the lens module, the photosensitive chip module is located on a side of the lens body 1 that is close to the base 10, the photosensitive chip module is movable within a first plane, and the first plane is parallel to the lens body 1. The photosensitive chip module has the photosensitive chip 6. The photosensitive chip 6 may receive light, convert a light signal into an electrical signal, and cooperate with other image processing devices to image the photographed object and realize photographing. The photosensitive chip module is mounted on the lens module, including a physical connection relationship and an electrical connection relationship, and the photosensitive chip module is flexibly mounted on the lens module, that is, the photosensitive chip module and the lens module have a connection relationship, but a relative position relationship can be changed.

It can be understood that the first plane is parallel to the lens body 1, that is, perpendicular to the primary optical axis of the lens body 1, so that the photosensitive chip module is movable within the first plane, that is, the photosensitive chip module is movable in a plane perpendicular to the primary optical axis of the lens body 1, so as to realize anti-shake; and the driving module is separately connected to the base 10 and the photosensitive chip module, the driving module is an electromagnetic driving module, the driving module is electrically connected to the photosensitive chip module, and the driving module drives the photosensitive chip module to move within the first plane for anti-shake. In this way, the electromagnetic force of the driving module is used to drive the photosensitive chip module to move within the first plane, so that the photosensitive chip module can move in a plane perpendicular to the primary optical axis of the lens body 1. As a result, a distance between the photosensitive chip module and the lens body 1 in a horizontal direction is changed to realize anti-shake, where the horizontal direction refers to a direction perpendicular to the primary optical axis of the lens body 1.

In the embodiments of this application, the electromagnetic driving module is used to drive the photosensitive chip module to move in a plane perpendicular to a primary optical axis of the lens body 1, so as to realize anti-shake. Compared with the traditional lens anti-shake, the structure is simple and compact, so as to generate a greater force.

Figure 9:
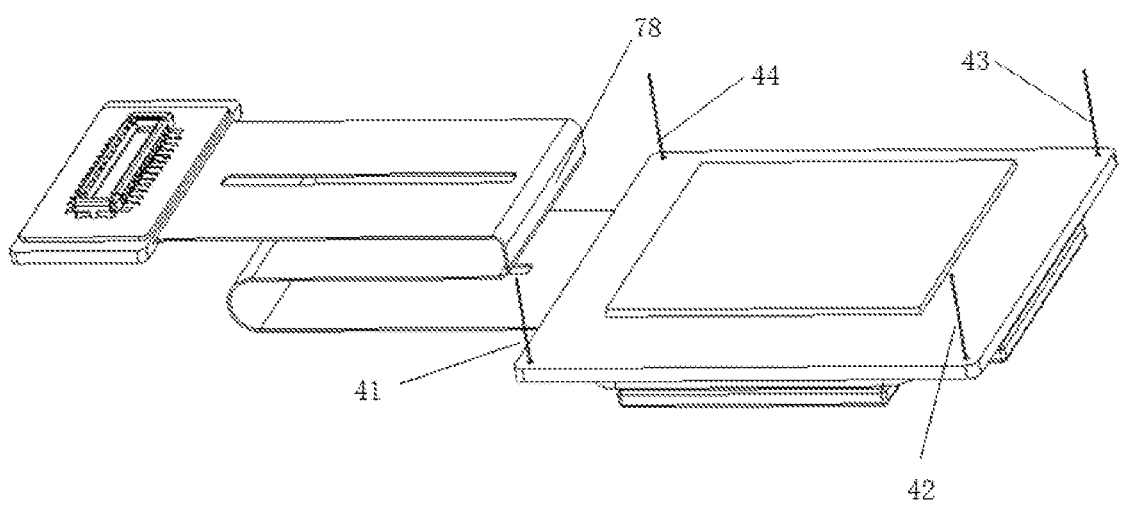

According to some embodiments of this application, the photosensitive chip module is mounted on the lens module through a suspension module, where the suspension module includes: a plurality of suspension members 4 and conductive connectors, where the plurality of suspension members 4 are separately connected to the lens module and the photosensitive chip module, and each of the suspension members 4 is deformable; the conductive connectors are separately electrically connected to the lens module and the photosensitive chip module. It should be noted that "a plurality of" refers to "more than two", that is, "the plurality of" suspension members 4 refer to "at least three" suspension members 4. For example, as shown in FIG. 9, there are four suspension members 4, so that the photosensitive chip module maintains stability for some degrees, and only moves within the first plane. Certainly, there may be three, five, or seven suspension members 4. The number is determined based on actual needs, and is not limited herein. In this way, the photosensitive chip module and the lens module can be connected through the suspension member 4, and the suspension member 4 is deformable, so that the photosensitive chip module may move within the first plane; and the conductive connector is used to achieve electrical connection between the photosensitive chip module and the lens module.

Figure 6:
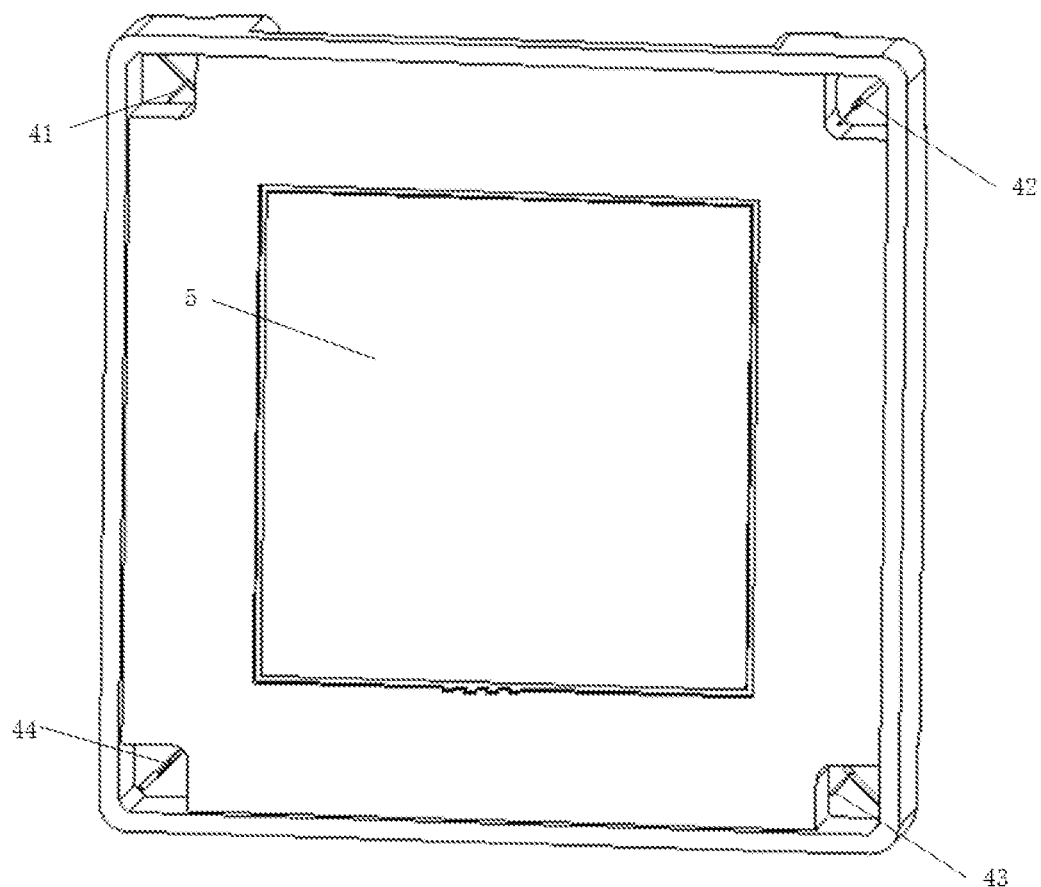

According to some embodiments of this application, the plurality of suspension members 4 are arranged at intervals along a circumferential direction of the lens module. In an optional embodiment, the plurality of suspension members 4 may be arranged at equal intervals. As shown in FIG. 6, the lower surface of the lens module is square, and 4 suspension members 4 are respectively located at four corners of the lower surface. Certainly, the plurality of suspension members 4 may not be arranged at equal intervals, which is determined based on actual needs, and is not limited herein. In this way, the photosensitive chip module may move within the first plane, and the photosensitive chip module can maintain stability for some degrees. The photosensitive chip module only moves within the first plane, and does not move within the second plane, and the second plane herein refers to a plane other than the first plane, thereby improving the stability and clarity of photographing.

According to some embodiments of this application, the suspension member 4 is configured as the conductive connector, and each of the suspension members 4 is a conductive elastic member. The suspension member 4 and the conductive connector are set as one, and the suspension member 4 is used to achieve the physical connection and the electrical connection between the lens module and the photosensitive chip module, so as to achieve the effects of reducing costs, reducing a weight, and saving a space.

According to some embodiments of this application, the lens module includes a frame 3, the frame 3 is provided with a plurality of conductive grooves, one end of each of the plurality of suspension members 4 is mounted in one of the conductive grooves correspondingly, and each of the suspension members 4 is electrically connected to the conductive groove; and the other end of each of the plurality of suspension members 4 is electrically connected to the photosensitive chip module. In this way, the electrical connection among the frame 3, the suspension member 4, and the photosensitive chip module can be achieved, which is simple and compact in structure, and easy to assemble.

The suspension member 4 suspends the photosensitive chip module, so that the photosensitive chip module can move for the purpose of anti-shake; in addition, two ends of the suspension member 4 are separately electrically connected to the frame 3 and the photosensitive chip module, to achieve the role of conduction with the outside world.

Figure 2:
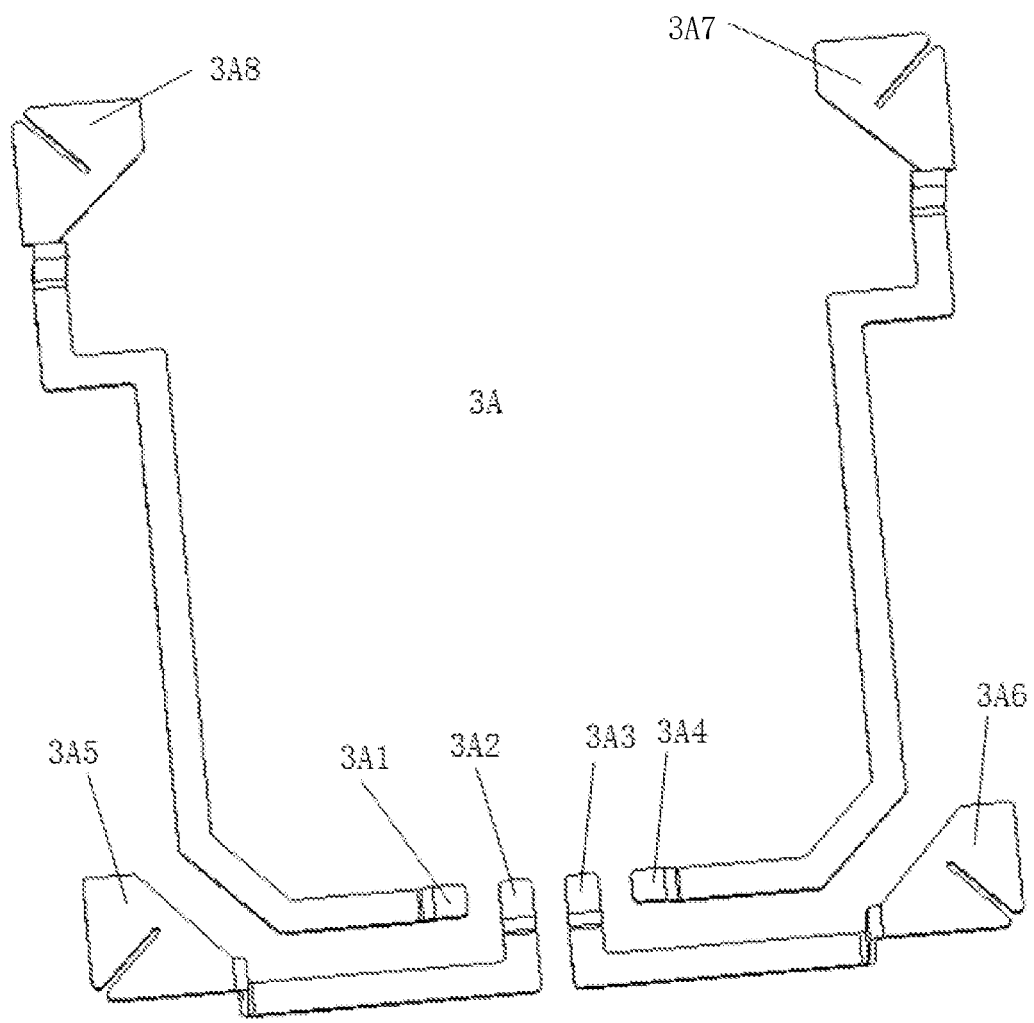
FIG. 2 to FIG. 13 are schematic diagrams of a partial structure of a photographing apparatus according to an embodiment of this application.
Figure 3:
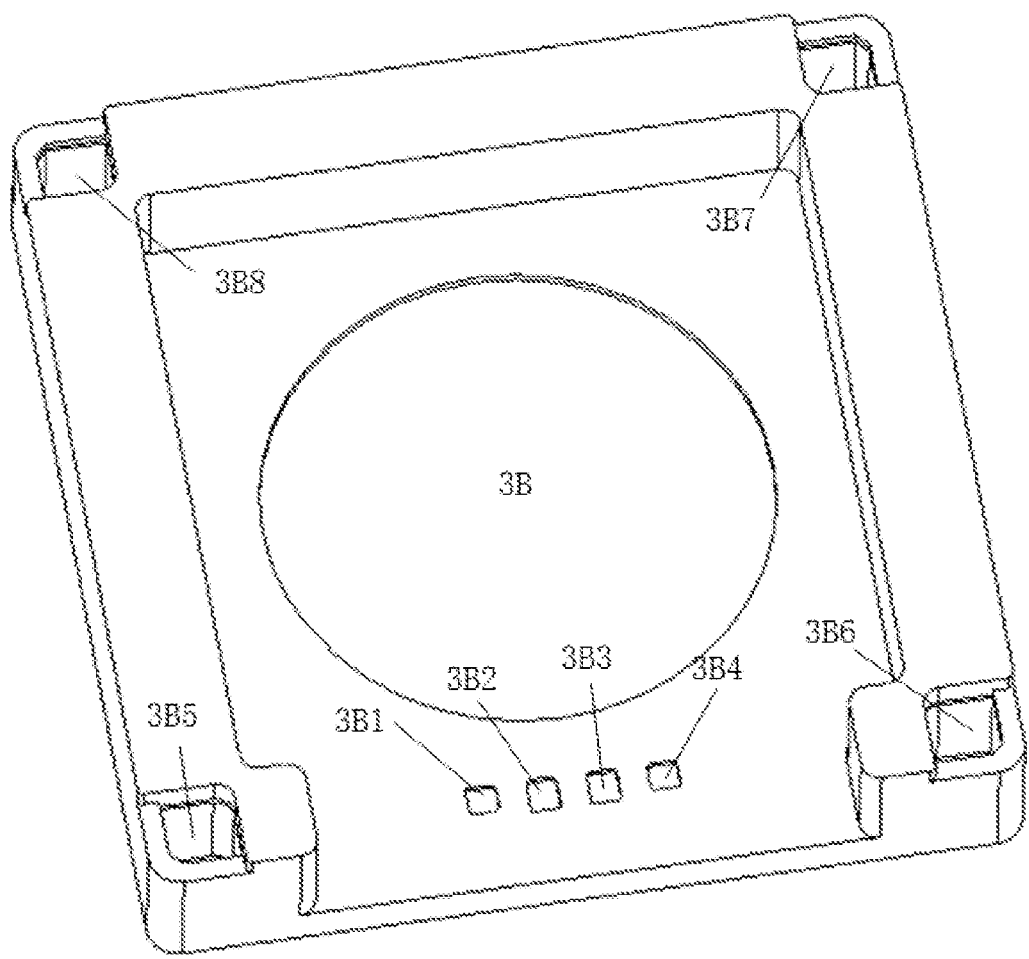
Figure 4:
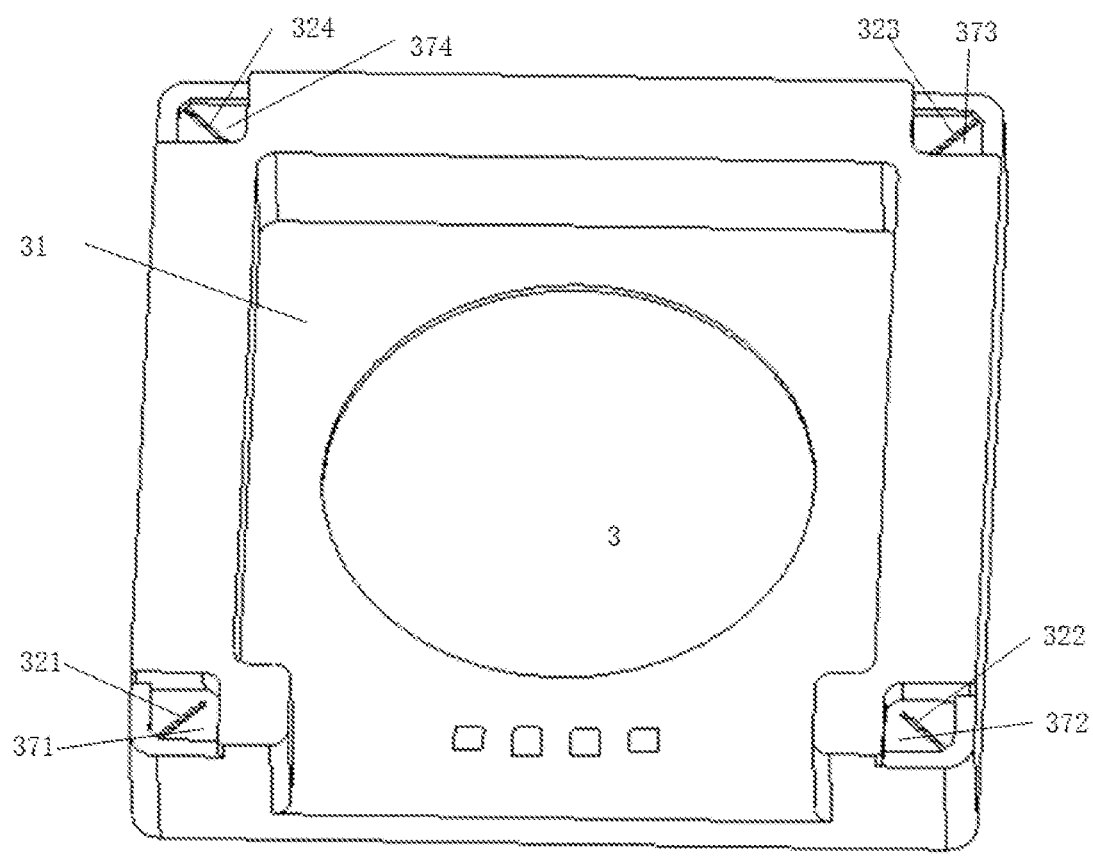

In a specific example of this application, as shown in FIG. 2, FIG. 3, and FIG. 4, the frame 3 includes an embedded metal part 3A and a plastic part 3B, which are molded by using the insert molding technology; the metal surface 3A1, the metal surface 3A2, the metal surface 3A3, and the metal surface 3A4 are respectively combined with the plastic part groove 3B1, the plastic part groove 3B2, the plastic part groove 3B3, and the plastic part groove 3B4, where the metal surface 3A1 and the plastic part groove 3B1 are combined as the metal welding pad 361, the metal surface 3A2 and the plastic part groove 3B2 are combined as the metal welding pad 362, the metal surface 3A3 and the plastic part groove 3B3 are combined as the metal welding pad 363, and the metal surface 3A4 and the plastic part groove 3B4 are combined as the metal welding pad 364; the metal surface 3A5, the metal surface 3A6, the metal surface 3A7, and the metal surface 3A8 are respectively combined with the plastic part groove 3B5, the plastic part groove 3B6, the plastic part groove 3B7, and the plastic part groove 3B8, where the metal surface 3A5 and the plastic part groove 3B5 are combined as the metal support surface 371, the metal surface 3A6 and the plastic part groove 3B6 are combined as the metal support surface 372, the metal surface 3A7 and the plastic part groove 3B7 are combined as the metal support surface 373, and the metal surface 3A8 and the plastic part groove 3B8 are combined as the metal support surface 374.

According to some embodiments of this application, the photosensitive chip module includes: a printed circuit board 7 (PCB) and a photosensitive chip 6, the photosensitive chip 6 is mounted on the printed circuit board 7, the photosensitive chip 6 is electrically connected to the printed circuit board 7, and the photosensitive chip 6 faces the lens body 1, the printed circuit board 7 is provided with a plurality of conductive mounting holes, the other end of each of the plurality of suspension members 4 is mounted in one of the conductive mounting holes correspondingly, and each of the suspension members 4 is electrically connected to the conductive mounting hole. The photosensitive chip 6 may receive the light, and convert an optical signal into an electrical signal. The electrical signal is transmitted to the printed circuit board 7 to cooperate with other image processing devices, so as to image the photographed object and realize the photographing. In this way, electrical connection is achieved between the printed circuit board 7 and the photosensitive chip 6, and between the printed circuit board 7 and the suspension member 4. In addition, because there is an electrical connection relationship between the frame 3 and the suspension member 4, an electrical connection relationship is formed among the frame 3, the suspension member 4, and the printed circuit board 7.

The printed circuit board 7 may be a flexible circuit board that is connected to the outside world.

In some embodiments of this application, as shown in FIG. 4, FIG. 6, FIG. 7, and FIG. 9, the printed circuit board 7 includes a circuit board 73, and each of four corners of the circuit board 73 has a conductive mounting hole, that is, a conductive mounting hole 741, a conductive mounting hole 742, a conductive mounting hole 743, and a conductive mounting hole 744. The conductive mounting hole 741 is fixed on one end of the suspension member 41 by welding, the conductive mounting hole 742 is fixed on one end of the suspension member 42 by welding, the conductive mounting hole 743 is fixed on one end of the suspension member 43 by welding, and the conductive mounting hole 744 is fixed on one end of the suspension member 44 by welding; the other end of the suspension member 41 is fixed in the conductive groove 321 of the frame 3 by welding, the other end of the suspension member 42 is fixed in the conductive groove 322 of the frame 3 by welding, the other end of the suspension member 43 is fixed in the conductive groove 323 of the frame 3 by welding, the other end of the suspension member 44 is fixed in the conductive groove 324 of the frame 3 by welding; so that the PCB 7 is fixed to the frame 3 through the suspension member 41, the suspension member 42, the suspension member 43, and the suspension member 44.

In the embodiments of this application, the circuit board carrying the photosensitive chip is suspended and fixed by using the suspension member, the driving module generates an electromagnetic force and drives the circuit board carrying the photosensitive chip to move, so as to realize the image anti-shake function.

Figure 7:
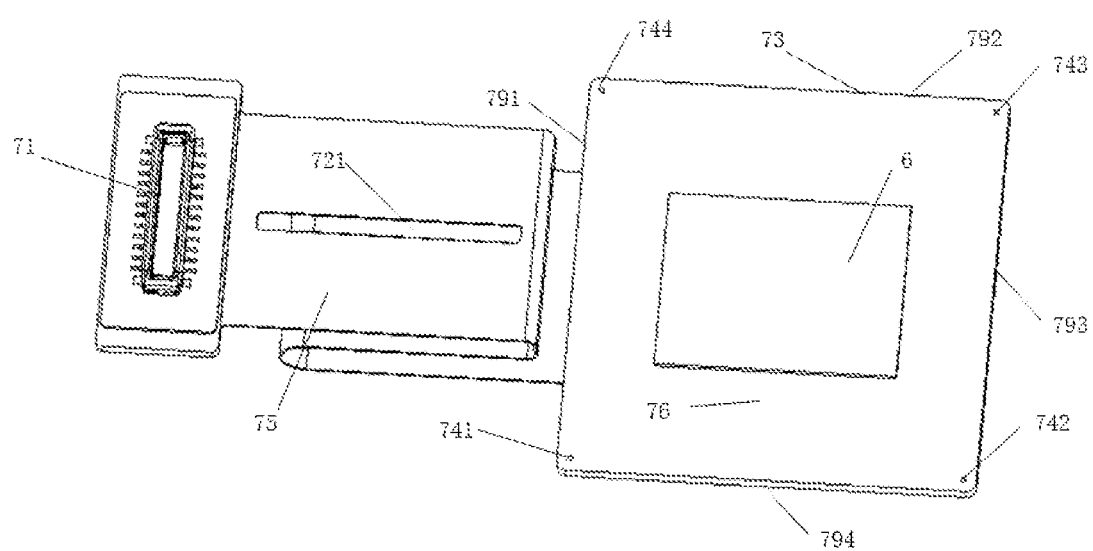
Figure 8:
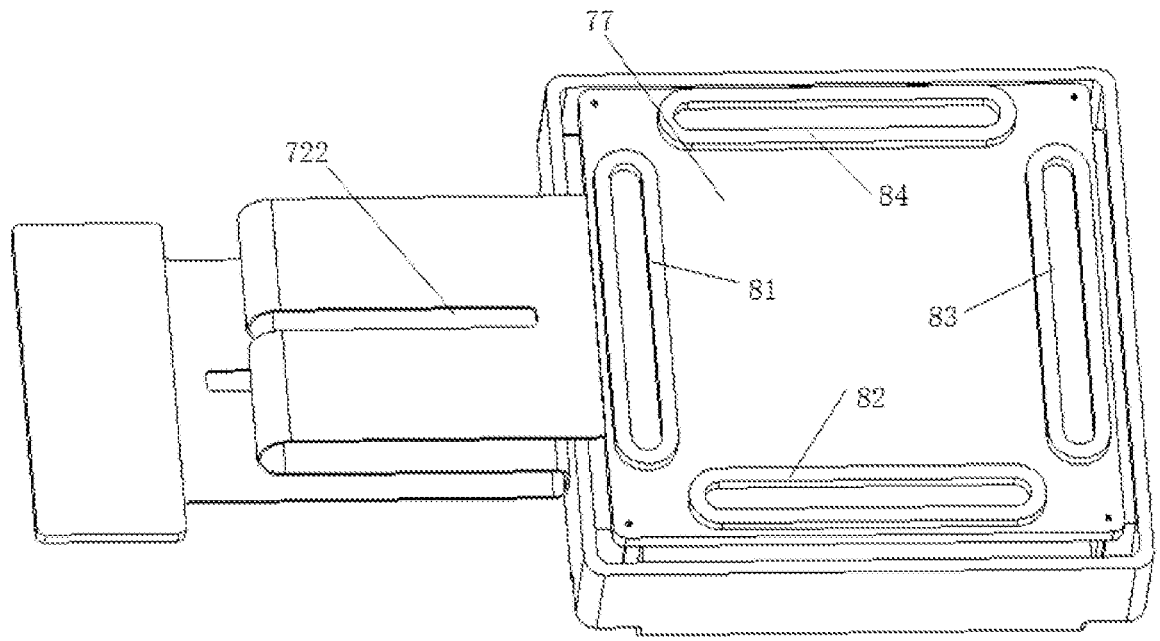

In some embodiments of this application, as shown in FIG. 7, FIG. 8, and FIG. 9, the PCB 7 includes a 3-layer S-shaped flexible board 75, and layers of the flexible board 75 are parallel to each other. There are the strip hole 721 and the strip hole 722 in the middle of the flexible board 75. The strip hole 721 and the strip hole 722 can reduce the torsion force that hinders the flexible board 75 from moving during movement. The number of the strip holes is not limited to 2, and can be adjusted based on the actual situation; one end of the flexible board 75 is connected to the connector 71, and is connected to the external circuit through the connector 71, so as to supply power to the entire apparatus; and the other end of the flexible board 75 is connected to the circuit board 73, and the chip 6 is fixed on an upper surface 76 of the circuit board 73 by using the surface mounting technology (SMT), so that the chip 6 is energized with the outside world. In this way, the suspension member 4 suspends and fixes the PCB 7, which facilitates displacement and movement of the PCB 7 and the photosensitive chip 6 fixed on the upper surface of the PCB 7 through the SMT, thereby achieving the purpose of anti-shake.

Figure 12:
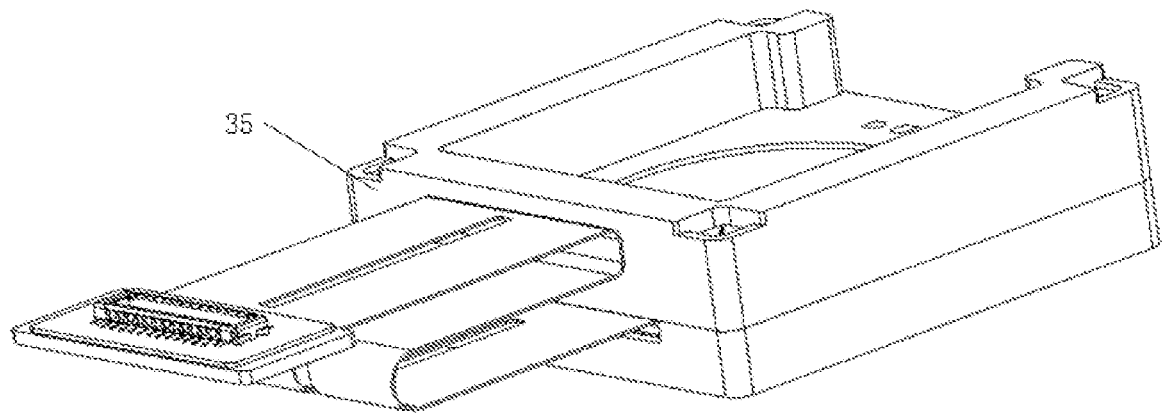
Figure 13:
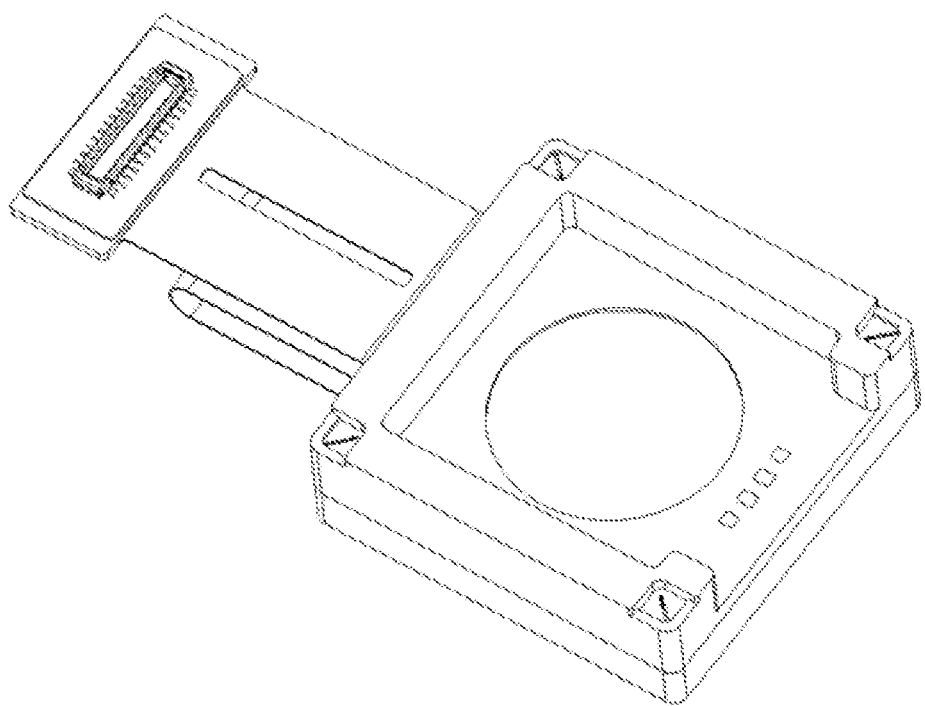

In some embodiments of this application, as shown in FIG. 9 and FIG. 12, the fixing surface 78 of the flexible board 75 is fixed on a side face 35 of the frame 3 by using the glue or the like, so as to prevent the connector 71 from affecting the PCB 7 to produce variation when being fastened outside, resulting in adverse effects.

Figure 5:
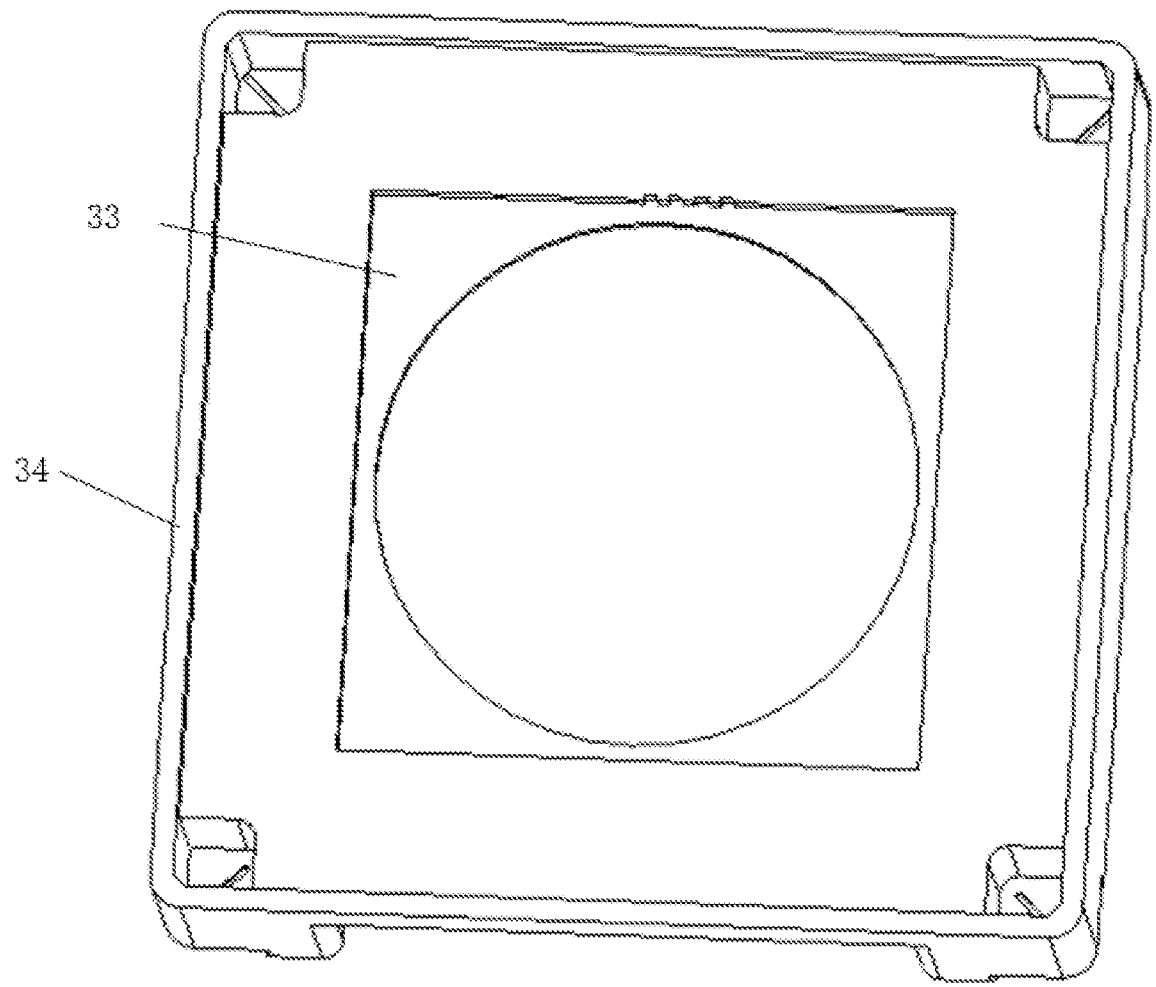
Figure 14:
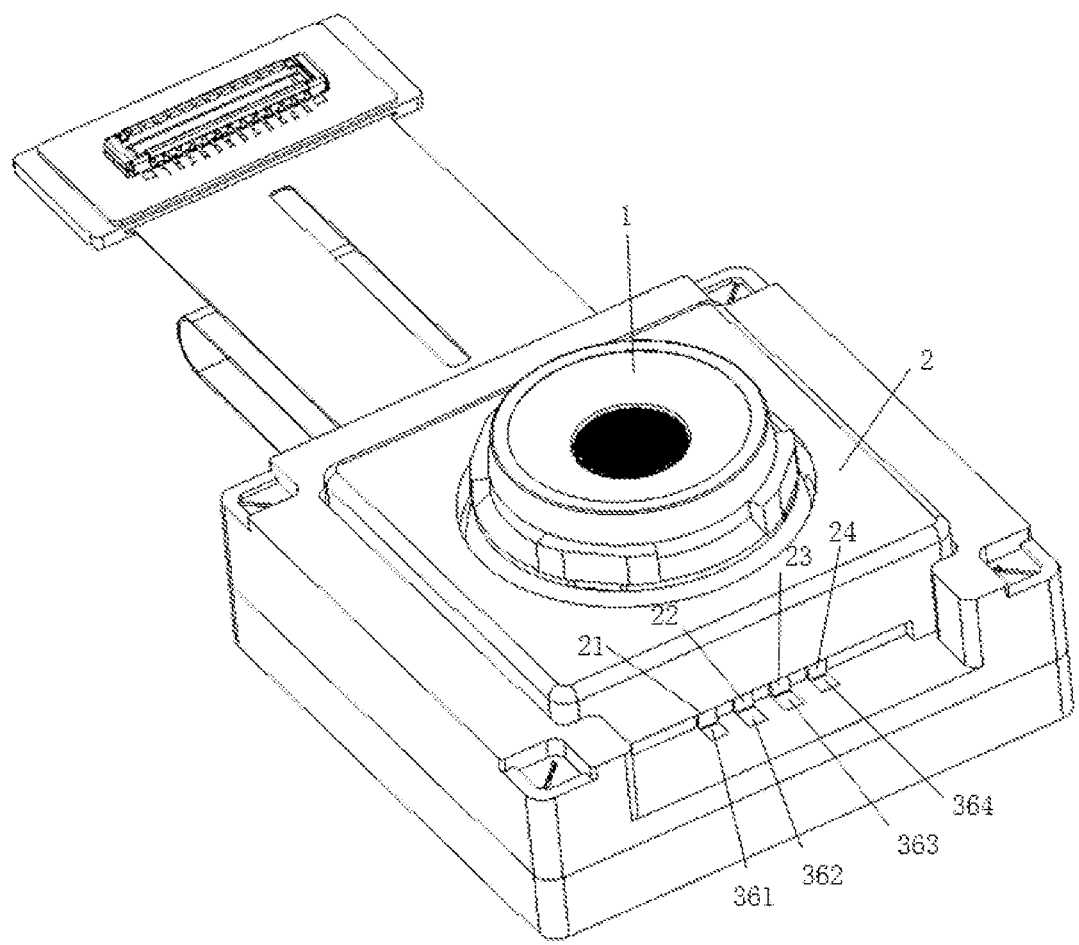
FIG. 14 is a schematic structural diagram of a photographing apparatus according to an embodiment of this application.
Figure 15:
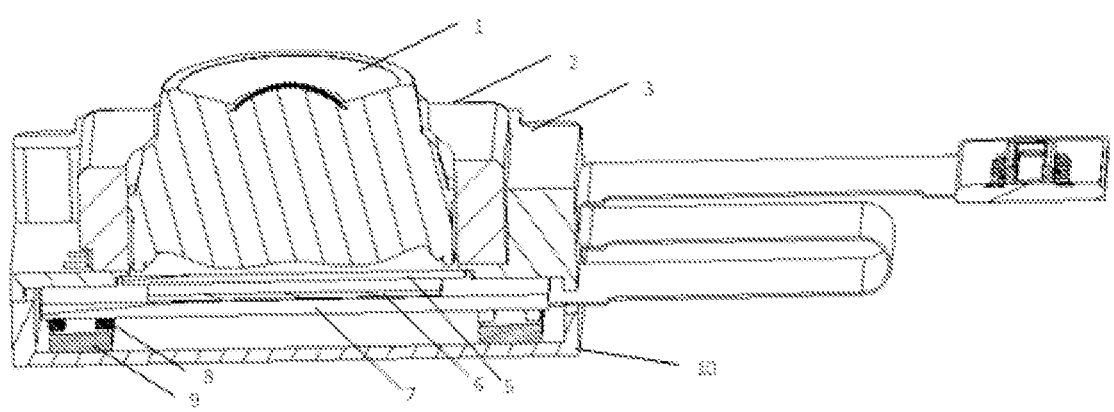
FIG. 15 and FIG. 16 are schematic sectional views of a photographing apparatus according to an embodiment of this application.
Figure 16:
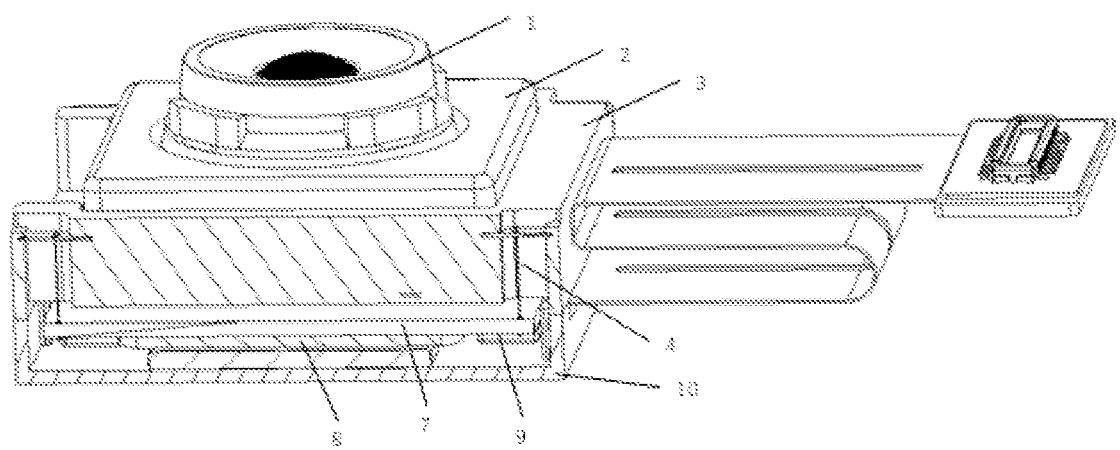

In some embodiments of this application, the photographing apparatus further includes: a filter 5, as shown in FIG. 5, FIG. 6, and FIG. 14. The filter 5 is fixed on a surface of the groove 33 at the bottom of the frame 3 by using the glue or the like, and the optical signal received by the lens body 1 is filtered through the filter 5.

According to some embodiments of this application, the driving module includes: a first driving assembly, where the first driving assembly includes a first acting member and a second acting member, where the first acting member is connected to the base 10, the second acting member is connected to the photosensitive chip module, and the first acting member interacts with the second acting member with magnetism in a first direction to drive the photosensitive chip module to move in the first direction. In this way, the first acting member interacts with the second acting member with magnetism in the first direction, so that the photosensitive chip module is driven to move in the first direction. A distance between the photosensitive chip module and the lens module is changed in the first direction, so as to compensate for the shaking of the photographing apparatus in the first direction, thereby realizing anti-shake.

According to some embodiments of this application, the driving module further includes: a second driving assembly, where the second driving assembly includes a third acting member and a fourth acting member, where the third acting member is connected to the base 10, the fourth acting member is connected to the photosensitive chip module, the third acting member interacts with the fourth acting member with magnetism in a second direction to drive the photosensitive chip module to move in the second direction, both the second direction and the first direction are within a same plane, and the second direction intersects the first direction.

In this way, the first acting member interacts with the second acting member with magnetism in the first direction, so that the photosensitive chip module is driven to move in the first direction. A distance between the photosensitive chip module and the lens module is changed in the first direction, so as to compensate for the shaking of the photographing apparatus in the first direction; the third acting member interacts with the fourth acting member with magnetism in the second direction, so that the photosensitive chip module is driven to move in the second direction. A distance between the photosensitive chip module and the lens module is changed in the second direction, so as to compensate for the shaking of the photographing apparatus in the second direction; in addition, because the second direction and the first direction are within the same plane, and the second direction intersects the first direction, through the joint action of the first driving assembly and the second driving assembly, the photosensitive chip module can move in all directions of the first plane. In this way, a distance between the photosensitive chip module and the lens module in each direction of the first plane can be changed, so as to compensate for the shaking generated by the photographing apparatus in all directions of the first plane.

According to some embodiments of this application, the photosensitive chip module includes: a printed circuit board 7 and a photosensitive chip 6 mounted on the printed circuit board 7, the first acting member is a magnetic member, the second acting member is a coil, the second acting member is electrically connected to the printed circuit board 7, and in a case that the second acting member is energized, the second acting member interacts with the first acting member with magnetism to drive the printed circuit board 7 to move in the first direction; and the third acting member is a magnetic member, the fourth acting member is a coil, the fourth acting member is electrically connected to the printed circuit board 7, and in a case that the fourth acting member is energized, the fourth acting member interacts with the third acting member with magnetism to drive the printed circuit board 7 to move in the second direction. Through the mutual magneto-electric interaction of the coil and the magnetic member, the PCB 7 and the photosensitive chip 6 are driven to perform the displacement movement, thereby realizing anti-shake.

Therefore, when the second acting member is energized, the second acting member interacts with the first acting member with magnetism to drive the printed circuit board 7 to move in the first direction; when the fourth acting member is energized, the fourth acting member interacts with the third acting member with magnetism to drive the printed circuit board 7 to move in the second direction; when both the second acting member and the fourth acting member are energized, the second acting member interacts with the first acting member with magnetism to drive the printed circuit board 7 to move in the first direction, and the fourth acting member interacts with the third acting member with magnetism to drive the printed circuit board 7 to move in the second direction; so that the photosensitive chip module can move in all directions of the first plane. In this way, a distance between the photosensitive chip module and the lens module in each direction of the first plane can be changed, so as to compensate for the shaking generated by the photographing apparatus in all directions of the first plane.

According to some embodiments of this application, the first acting member and the third acting member are fixedly mounted on the base 10.

According to some embodiments of this application, the first driving assembly includes a plurality of groups of first acting members and a plurality of groups of second acting members arranged at intervals; and the second driving assembly includes a plurality of groups of third acting members and a plurality of groups of fourth acting members arranged at intervals. The "plurality of groups of" may be two groups, three groups, or other situations, which is determined based on actual needs, and is not limited herein. The first driving assembly includes two groups of first acting members and two groups of second acting members arranged at intervals; and the second driving assembly includes two groups of third acting members and two groups of fourth acting members arranged at intervals.

Figure 10:
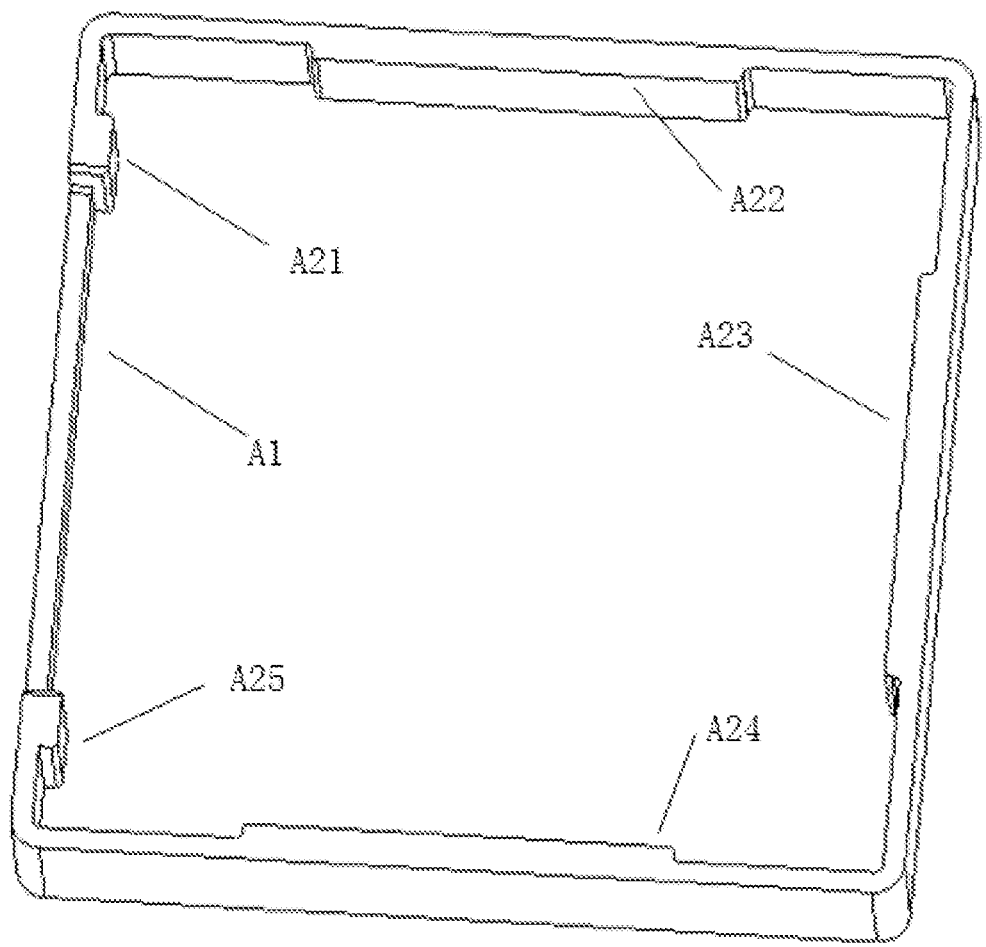
Figure 11:
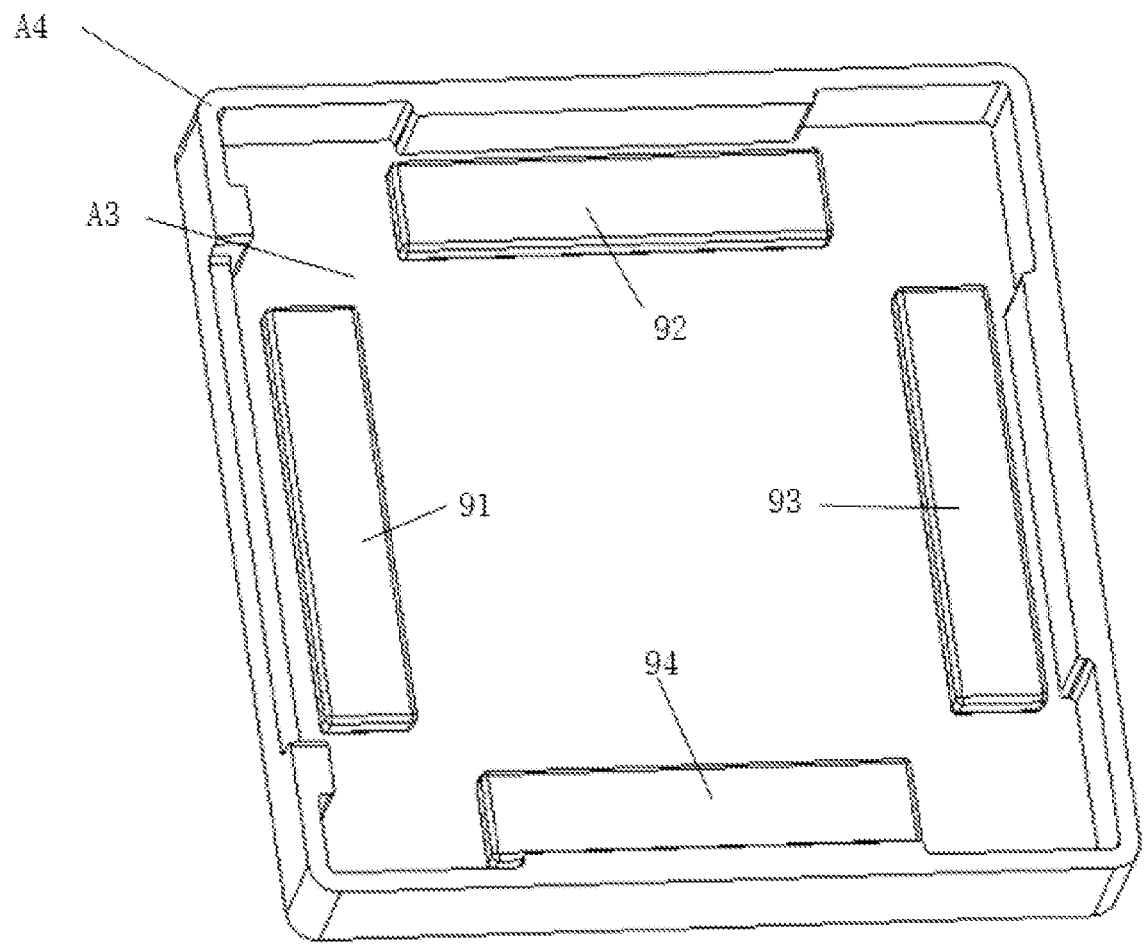

In some embodiments of this application, as shown in FIG. 8, FIG. 10, and FIG. 11, there are a second acting member 81, a second acting member 83, a fourth acting member 82, and a fourth acting member 84, where the second acting member 81, the second acting member 83, the fourth acting member 82, and the fourth acting member 84 are denoted as a component 8, and the four acting members (which may be coils) are symmetrically distributed on a lower surface 77 of the circuit board 73. The second acting member 81, the fourth acting member 82, the second acting member 83, and the fourth acting member 84 are connected to the circuit board 73. There are a first acting member 91, a third acting member 92, a first acting member 93, and a third acting member 94, where the first acting member 91, the third acting member 92, the first acting member 93, and the third acting member 94 are denoted as a component 9, and the four acting members (which may be magnetic members, such as magnets) are symmetrically fixed on the surface A3 of the base 10 by using the glue or the like. A center of the second acting member 81 is corresponding to a center of the first acting member 91, a center of the fourth acting member 82 is corresponding to a center of the third acting member 92, a center of the second acting member 83 is corresponding to a center of the first acting member 93, and a center of the fourth acting member 84 is corresponding to a center of the third acting member 94. Through the principle that the charged coil is subjected to force in the magnetic field, the PCB 7 and the photosensitive chip 6 are driven to perform the displacement movement in the apparatus, so as to realize the effect of anti-shake. The second acting member 81, the fourth acting member 82, the second acting member 83, the fourth acting member 84, the first acting member 91, the third acting member 92, the first acting member 93, and the third acting member 94 jointly form the driving module of the entire apparatus.

In some embodiments of this application, as shown in FIG. 7, FIG. 10, FIG. 11, and FIG. 13, the base 10 includes a side boss A21, a side boss A22, a side boss A23, a side boss A24, and a side boss A25, which colliding with a side face 791, a side face 792, a side face 793, and a side face 794 of the PCB 7 to prevent other parts of the PCB 7 from being hit, where the side boss A21 and the side boss A25 are corresponding to the side face 791, the side boss A22 is corresponding to the side face 792, the side boss A23 is corresponding to the side face 793, and the side boss A24 is corresponding to the side face 794; the base A includes an alcove A1, with the purpose of leaving a space for the PCB 7, and preventing the flexible board 75 from colliding with the base A during the anti-shake movement.

Figure 17:
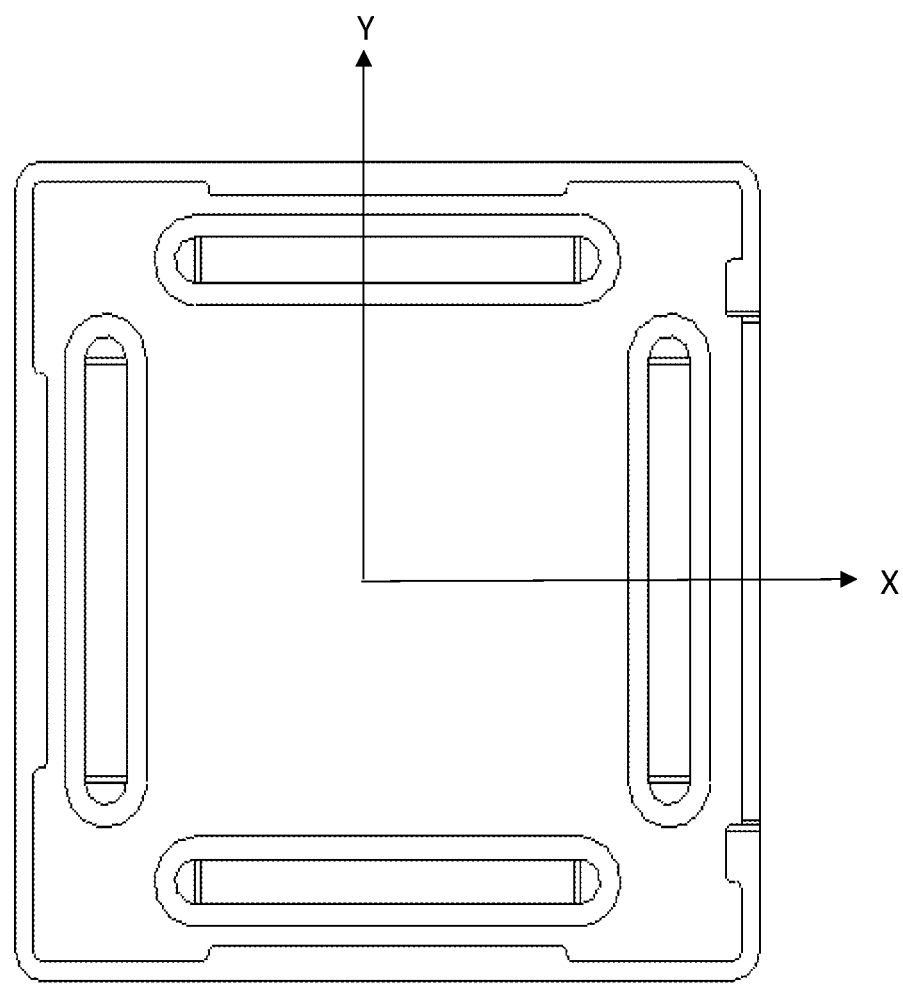
FIG. 17 and FIG. 18 are schematic diagrams of a driving module of a photographing apparatus according to an embodiment of this application.
Figure 18:
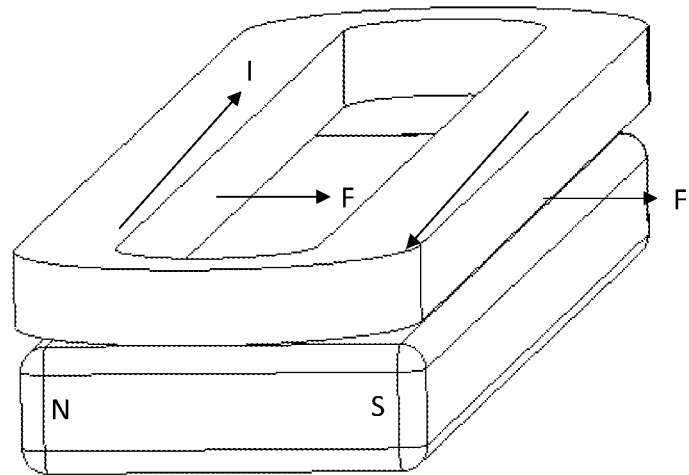

In some embodiments of this application, as shown in FIG. 17 and FIG. 18, X represents the first direction, Y represents the second direction, N represents the N pole of the magnet, S represents the S pole of the magnet, I represents the direction of the current, and F represents the direction of the Lorentz force on the coil.

According to some embodiments of this application, the lens module includes a frame 3, the photosensitive chip module includes a printed circuit board 7 and a photosensitive chip 6 mounted on the printed circuit board 7, the base 10 includes a baseplate and a side wall surrounding the baseplate, the side wall is connected to an edge of the baseplate, the frame 3 is mounted on the side wall, an installation cavity is formed among the frame 3, the side wall, and the baseplate, the driving module and the photosensitive chip 6 are located in the installation cavity, and a part of the printed circuit board 7 protrudes out of the installation cavity.

In some embodiments of this application, an upper surface A4 of the base 10 is fixed on a lower surface 34 of the frame 3 by using the glue or the like, so that the photosensitive chip 6, a part of the PCB 7, the suspension member 4, the filter sheet 5, and the driving module are surrounded to prevent external force.

In some embodiments of this application, the lens module further includes: a motor 2, and the motor 2 is used to drive the lens body 1 to perform displacement movement, so as to realize automatic focusing of the camera module. The motor 2 and the lens body 1 are fixed by using the glue or the like, and are used as an auto focusing (AF) driving part of the entire apparatus; the motor 2 in this solution is described by taking a closed-loop motor as an example, but it is not limited to a closed-loop drive motor, it also includes an open-loop motor and a mid-mounted motor.

In some embodiments of this application, as shown in FIG. 4 and FIG. 14, the entire AF driving part that is obtained after the lens body 1 is fixed to the motor 2 by using the glue is fixed on the groove 31 of the frame 3 by using the glue, so that the AF driving part is fixed to the anti-shake part; the connection pin 21 of the motor 2, the connection pin 22 of the motor 2, the connection pin 23 of the motor 2, and the connection pin 24 of the motor 2 are respectively connected to the metal welding pad 361, the metal welding pad 362, the metal welding pad 363, and the metal welding pad 364 by welding, so that the suspension member 4 and the PCB 7 are connected to the outside world, and thus the AF driving part is connected to the outside world.

In the embodiments of this application, the circuit board carrying the photosensitive chip is suspended and fixed by using the suspension member, the electromagnetic force generated by the charged coil in the magnetic field is used to drive the circuit board carrying the photosensitive chip to move, so as to realize the image anti-shake function. As for the sensor (chip) anti-shake, the structure is simple and compact, and the space reserved for the driving module is relatively large, so that a large magnet or multi-coil design may be used to generate a larger force.

Based on the photographing apparatus provided in the embodiments of this application, an embodiment of this application further provides an electronic device. The electronic device includes the photographing apparatus described in any of the foregoing embodiments.

Based on the photographing apparatus provided in the embodiments of this application, an embodiment of this application further provides a control method of a photographing apparatus, where the method includes: receiving an input of a user; and driving, by the driving module in response to the input, the photosensitive chip module to move within the first plane for anti-shake.

In the embodiments of this application, by receiving the input of the user, in response to the input, the electromagnetic driving module is used to drive the photosensitive chip module to move within a plane parallel to the lens body 1, so as to realize anti-shake. Compared with traditional lens anti-shake, a larger force may be generated.

It should be noted that an execution subject of the control method of a photographing apparatus provided in this embodiment of this application may be a photographing apparatus or a control module in the photographing apparatus for executing the control method of a photographing apparatus. In this embodiment of this application, an example in which the photographing apparatus executes the control method of a photographing apparatus is used to describe the photographing apparatus provided in the embodiments of this application.

An embodiment of this application provides a photographing apparatus, including: a receiving module, configured to receive an input of a user; and a driving module, configured to drive, in response to the input, the photosensitive chip module to move within the first plane for anti-shake.

In the embodiments of this application, by receiving the input of the user, in response to the input, the electromagnetic driving module is used to drive the photosensitive chip module to move within a plane parallel to the lens body 1, so as to realize anti-shake. Compared with traditional lens anti-shake, a larger force may be generated.

The photographing apparatus in this embodiment of this application may be an apparatus, or a component, an integrated circuit, or a chip in a terminal. The apparatus may be a mobile electronic device or a non-mobile electronic device. For example, the mobile electronic device may be a mobile phone, a tablet computer, a notebook computer, a palmtop computer, an in-vehicle electronic device, a wearable device, an ultra-mobile personal computer (UMPC), a netbook, a personal digital assistant (PDA), or the like. The non-mobile electronic device may be a server, a network attached storage (NAS), a personal computer (PC), a television (TV), a teller machine, a self-service machine, or the like. This is not specifically limited in the embodiments of this application.

The photographing apparatus in this embodiment of this application may be an apparatus with an operating system. The operating system may be an Android operating system, may be an iOS operating system, or may be another possible operating system, which is not specifically limited in the embodiments of this application.

The photographing apparatus provided in the embodiments of this application can implement the processes that are implemented in the foregoing method embodiments. To avoid repetition, details are not described herein again.

Optionally, an embodiment of this application further provides an electronic device, including a processor, a memory, and a program or an instruction stored in the memory and executable on the processor. When the program or the instruction is executed by the processor, the processes of the foregoing method embodiments for controlling a photographing apparatus are implemented, and a same technical effect can be achieved. To avoid repetition, details are not described herein again.

It should be noted that the electronic device in this embodiment of this application includes the mobile electronic device and the non-mobile electronic device described above.

Figure 19:
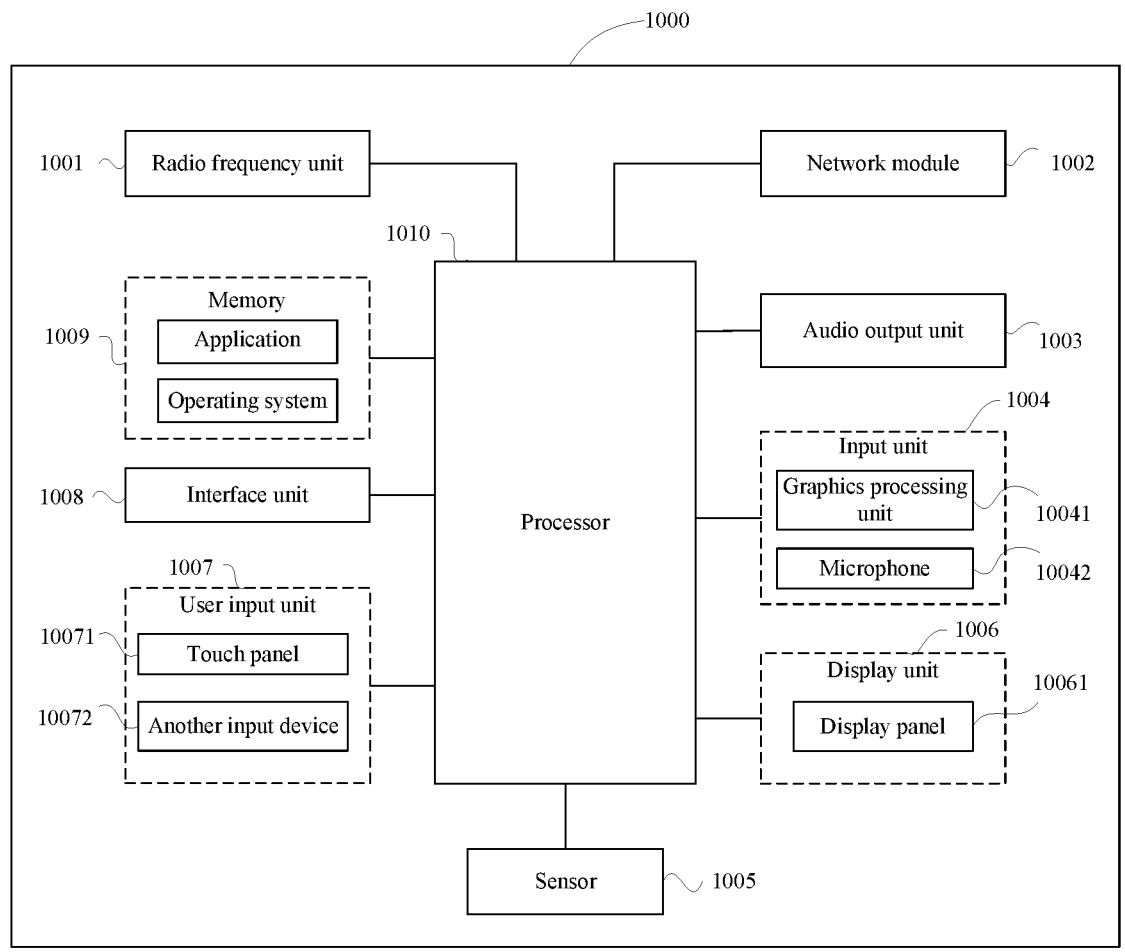
FIG. 19 is a schematic diagram of a hardware structure of an electronic device according to an embodiment of this application.

FIG. 19 is a schematic structural diagram of an electronic device according to an embodiment of this application.

The electronic device 1000 includes but is not limited to components such as a radio frequency unit 1001, a network module 1002, an audio output unit 1003, an input unit 1004, a sensor 1005, a display unit 1006, a user input unit 1007, an interface unit 1008, a memory 1009, and a processor 1010.

A person skilled in the art can understand that the electronic device 1000 may further include a power supply (for example, a battery) that supplies power to the components. The power supply may be logically connected to the processor 1010 by using a power management system, so as to implement functions such as charging management, discharging management, and power consumption management by using the power management system. The electronic device is not limited to the electronic device structure shown in FIG. 19. The electronic device may include more or fewer components than those shown in the figure, or combine some of the components, or arrange the components differently. Details are not described herein.

The user input unit 1007 is configured to receive an input of a user; and the processor 1010 is configured to drive, in response to the input, the photosensitive chip module to move within the first plane for anti-shake.

In the embodiments of this application, by receiving the input of the user, in response to the input, the electromagnetic driving module is used to drive the photosensitive chip module to move within a plane parallel to the lens body 1, so as to realize anti-shake. Compared with traditional lens anti-shake, a larger force may be generated.

It should be understood that, in the embodiments of this application, the input unit 1004 may include a graphics processing unit (GPU) 10041 and a microphone 10042, and the graphics processing unit 10041 processes image data of a still picture or video obtained by an image capture apparatus (such as a camera) in a video capture mode or an image capture mode. The display unit 1006 may include a display panel 10061, and the display panel 10061 may be configured in a form of a liquid crystal display, an organic light-emitting diode, or the like. The user input unit 1007 includes a touch panel 10071 and another input device 10072. The touch panel 10071 is also referred to as a touch screen. The touch panel 10071 may include two parts: a touch detection apparatus and a touch controller. The another input device 10072 may include but is not limited to a physical keyboard, a function key (such as a volume control key or an on/off key), a trackball, a mouse, a joystick, and the like. Details are not described herein again. The memory 1009 may be configured to store a software program and various data, which includes but is not limited to application programs and operating systems. An application processor and a modem processor may be integrated into the processor 1010. The application processor mainly processes an operating system, a user interface, an application program, and the like. The modem processor mainly processes wireless communications. It can be understood that, alternatively, the modem processor may not be integrated into the processor 1010.

An embodiment of this application further provides a readable storage medium, where the readable storage medium stores a program or an instruction, and when the program or the instruction is executed by a processor, the processes of the foregoing method embodiments for controlling a photographing apparatus are implemented, and a same technical effect can be achieved. To avoid repetition, details are not described herein again.

The processor is a processor in the electronic device in the foregoing embodiments. The readable storage medium includes a computer-readable storage medium such as a read-only memory (ROM), a random access memory (RAM), a magnetic disk, an optical disc, or the like.

An embodiment of this application still provides a chip. The chip includes a processor and a communications interface, and the communications interface is coupled to the processor. The processor is configured to run a program or an instruction to implement the processes of the foregoing method embodiments for controlling a photographing apparatus, and a same technical effect can be achieved. To avoid repetition, details are not described herein again.

It should be understood that the chip mentioned in the embodiments of this application may also be referred to as a system-on-chip, a system chip, a chip system, a system-on-a-chip, or the like.

It should be noted that, in this specification, the terms "include", "comprise", or their any other variant is intended to cover a non-exclusive inclusion, so that a process, a method, an article, or an apparatus that includes a list of elements not only includes those elements but also includes other elements which are not expressly listed, or further includes elements inherent to such process, method, article, or apparatus. In the absence of more restrictions, an element defined by the statement "including a . . . " does not preclude the presence of other identical elements in the process, method, article, or apparatus that includes the element. In addition, it should be noted that the scope of the methods and apparatuses in the embodiments of this application is not limited to performing functions in the order shown or discussed, but may also include performing the functions in a basically simultaneous manner or in opposite order based on the functions involved. For example, the described methods may be performed in a different order from the described order, and various steps may be added, omitted, or combined. In addition, features described with reference to some examples may be combined in other examples.

Based on the descriptions of the foregoing implementations, a person skilled in the art may clearly understand that the method in the foregoing embodiment may be implemented by software in addition to a necessary universal hardware platform or by hardware only. In most circumstances, the former is a preferred implementation. Based on such an understanding, the technical solutions of this application essentially, or the part contributing to the prior art may be implemented in a form of a software product. The computer software product is stored in a storage medium (for example, a ROM/RAM, a magnetic disk, or a compact disc), and includes a plurality of instructions for instructing a terminal (which may be a mobile phone, a computer, a server, an air conditioner, a network device, or the like) to perform the method described in the embodiments of this application.

The embodiments of this application are described above with reference to the accompanying drawings, but this application is not limited to the foregoing specific implementations. The foregoing specific implementations are merely schematic instead of restrictive. Under enlightenment of this application, a person of ordinary skills in the art may make many forms without departing from aims and the protection scope of claims of this application, all of which fall within the protection scope of this application.

What is claimed is:

1. A photographing apparatus, comprising:
   a base;
   a lens module, wherein the lens module is mounted on the base, the lens module is fixedly arranged relative to the base, and the lens module comprises a lens body;
   a photosensitive chip module, wherein the photosensitive chip module is mounted on the lens module, the photosensitive chip module is located on a side of the lens body that is close to the base, the photosensitive chip module is movable within a first plane, and the first plane is parallel to the lens body; and
   a driving module, wherein the driving module is separately connected to the base and the photosensitive chip module, the driving module is an electromagnetic driving module, the driving module is electrically connected to the photosensitive chip module, and the driving module drives the photosensitive chip module to move within the first plane for anti-shake;
   wherein the photosensitive chip module is mounted on the lens module through a suspension module, the suspension module comprises a plurality of suspension members;
   wherein the lens module comprises a frame, the frame is provided with a plurality of conductive grooves, one end of each of the plurality of suspension members is mounted in a corresponding one of the plurality of conductive grooves, and each of the suspension members is electrically connected to the corresponding one of the plurality of conductive grooves; and the other end of each of the plurality of suspension members is electrically connected to a printed circuit board included in the photosensitive chip module, and the printed circuit board is electrically connected to a photosensitive chip included in the photosensitive chip module;
   wherein each of the plurality of suspension members is connected to the lens module and the photosensitive chip module, and each of the suspension members is a deformable conductive elastic member which electrically connects the lens module to the photosensitive chip module;
   wherein the frame comprises a metal part and a plastic part; the lens module further comprises a motor, configured to drive the lens body to perform displacement movement; and the motor comprises a first connection pin, a second connection pin, a third connection pin and a fourth connection pin; wherein,
   a first metal surface of the metal part and a first plastic part groove of the plastic part are combined as a first metal welding pad;
   a second metal surface of the metal part and a second plastic part groove of the plastic part are combined as a second metal welding pad;
   a third metal surface of the metal part and a third plastic part groove of the plastic part are combined as a third metal welding pad; and
   a fourth metal surface of the metal part and a fourth plastic part groove of the plastic part are combined as a fourth metal welding pad;
   wherein the first metal welding pad, the second metal welding pad, the third metal welding pad and the fourth metal welding pad are respectively connected to the first connection pin, the second connection pin, the third connection pin and the fourth connection pin by welding.

2. The photographing apparatus according to claim 1, wherein the plurality of suspension members are arranged at intervals along a circumferential direction of the lens module.

3. The photographing apparatus according to claim 1, wherein the photosensitive chip is mounted on the printed circuit board, and the photosensitive chip faces the lens body, the printed circuit board is provided with a plurality of conductive mounting holes, the other end of each of the plurality of suspension members is mounted in a corresponding one of the plurality of conductive mounting holes, and each of the suspension members is electrically connected to the corresponding one of the plurality of conductive mounting holes.

4. The photographing apparatus according to claim 1, wherein the driving module comprises:
   a first driving assembly, wherein the first driving assembly comprises a first acting member and a second acting member, wherein the first acting member is connected to the base, the second acting member is connected to the photosensitive chip module, and the first acting member interacts with the second acting member with magnetism in a first direction to drive the photosensitive chip module to move in the first direction.

5. The photographing apparatus according to claim 4, wherein the driving module further comprises:
   a second driving assembly, wherein the second driving assembly comprises a third acting member and a fourth acting member, wherein the third acting member is connected to the base, the fourth acting member is connected to the photosensitive chip module, the third acting member interacts with the fourth acting member with magnetism in a second direction to drive the photosensitive chip module to move in the second direction, both the second direction and the first direction are within a same plane, and the second direction intersects the first direction.

6. The photographing apparatus according to claim 5, wherein the photosensitive chip module comprises: a printed circuit board and a photosensitive chip mounted on the printed circuit board, the first acting member is a magnetic member, the second acting member is a coil, the second acting member is electrically connected to the printed circuit board, and in a case that the second acting member is energized, the second acting member interacts with the first acting member with magnetism to drive the printed circuit board to move in the first direction; and the third acting member is a magnetic member, the fourth acting member is a coil, the fourth acting member is electrically connected to the printed circuit board, and in a case that the fourth acting member is energized, the fourth acting member interacts with the third acting member with magnetism to drive the printed circuit board to move in the second direction.

7. The photographing apparatus according to claim 6, wherein the first acting member and the third acting member are fixedly mounted on the base.

8. The photographing apparatus according to claim 5, wherein the first driving assembly comprises a plurality of groups of first acting members and a plurality of groups of second acting members arranged at intervals; and the second driving assembly comprises a plurality of groups of third acting members and a plurality of groups of fourth acting members arranged at intervals.

9. The photographing apparatus according to claim 1, wherein the photosensitive chip is mounted on the printed circuit board, the base comprises a baseplate and a side wall surrounding the baseplate, the side wall is connected to an edge of the baseplate, the frame is mounted on the side wall, an installation cavity is formed among the frame, the side wall, and the baseplate, the driving module and the photosensitive chip are located in the installation cavity, and a part of the printed circuit board protrudes out of the installation cavity.

10. A control method of a photographing apparatus, wherein the method is applied to the photographing apparatus according to claim 1, and the method comprises:
receiving an input of a user; and
driving, by the driving module in response to the input, the photosensitive chip module to move within the first plane for anti-shake.

11. An electronic device, wherein the electronic device comprises a processor, a memory, and an instruction stored in the memory and executable on the processor, and when the instruction is executed by the processor, steps of the control method of a photographing apparatus according to claim 10 are implemented.

12. A non-transitory readable storage medium, wherein the non-transitory readable storage medium stores an instruction, and when the instruction is executed by a processor, steps of the control method of a photographing apparatus according to claim 10 are implemented.

13. The photographing apparatus according to claim 1, wherein the printed circuit board is provided with a plurality of conductive mounting holes, the one end of each of the plurality of suspension members is fixed on the corresponding one of the plurality of conductive grooves in the frame by welding, and the other end of each of the plurality of suspension members is fixed on a corresponding one of the plurality of conductive mounting holes in the printed circuit board by welding.

14. The photographing apparatus according to claim 1, wherein the base comprises:
a first side protrusion facing towards a first side face of the printed circuit board;
a second side protrusion facing towards a second side face of the printed circuit board;
a third side protrusion facing towards a third side face of the printed circuit board; and
fourth and fifth side protrusions facing towards a fourth side face of the printed circuit board;
wherein a recess is provided between the fourth side protrusion and the fifth side protrusions for leaving a space for a flexible board of the printed circuit board.

15. The photographing apparatus according to claim 1, wherein,
a fifth metal surface of the metal part and a fifth plastic part groove of the plastic part are combined as a first metal support surface, the first metal support surface is electrically connected to the second metal surface, and the first metal support surface is provided with a first one of the plurality of conductive grooves;
a sixth metal surface of the metal part and a sixth plastic part groove of the plastic part are combined as a second metal support surface, the second metal support surface is electrically connected to the third metal surface, and the second metal support surface is provided with a second one of the plurality of conductive grooves;
a seventh metal surface of the metal part and a seventh plastic part groove of the plastic part are combined as a third metal support surface, the third metal support surface is electrically connected to the fourth metal surface, and the third metal support surface is provided with a third one of the plurality of conductive grooves; and
an eighth metal surface of the metal part and an eighth plastic part groove of the plastic part are combined as a fourth metal support surface, the fourth metal support surface is electrically connected to the first metal surface, and the fourth metal support surface is provided with a fourth one of the plurality of conductive grooves.

16. An electronic device, comprising a photographing apparatus, wherein the photographing apparatus comprises:
a base;
a lens module, wherein the lens module is mounted on the base, the lens module is fixedly arranged relative to the base, and the lens module comprises a lens body;
a photosensitive chip module, wherein the photosensitive chip module is mounted on the lens module, the photosensitive chip module is located on a side of the lens body that is close to the base, the photosensitive chip module is movable within a first plane, and the first plane is parallel to the lens body; and
a driving module, wherein the driving module is separately connected to the base and the photosensitive chip module, the driving module is an electromagnetic driving module, the driving module is electrically connected to the photosensitive chip module, and the driving module drives the photosensitive chip module to move within the first plane for anti-shake;
wherein the photosensitive chip module is mounted on the lens module through a suspension module, the suspension module comprises a plurality of suspension members;
wherein the lens module comprises a frame, the frame is provided with a plurality of conductive grooves, one end of each of the plurality of suspension members is mounted in a corresponding one of the plurality of conductive grooves, and each of the suspension members is electrically connected to the corresponding one of the plurality of conductive grooves; and the other end of each of the plurality of suspension members is electrically connected to a printed circuit board included in the photosensitive chip module, and the printed circuit board is electrically connected to a photosensitive chip included in the photosensitive chip module;
wherein each of the plurality of suspension members is connected to the lens module and the photosensitive chip module, and each of the suspension members is a deformable conductive elastic member which electrically connects the lens module to the photosensitive chip module;

wherein the frame comprises a metal part and a plastic part; the lens module further comprises a motor, configured to drive the lens body to perform displacement movement; and the motor comprises a first connection pin, a second connection pin, a third connection pin and a fourth connection pin; wherein, a first metal surface of the metal part and a first plastic part groove of the plastic part are combined as a first metal welding pad;

a second metal surface of the metal part and a second plastic part groove of the plastic part are combined as a second metal welding pad;

a third metal surface of the metal part and a third plastic part groove of the plastic part are combined as a third metal welding pad; and a fourth metal surface of the metal part and a fourth plastic part groove of the plastic part are combined as a fourth metal welding pad;

wherein the first metal welding pad, the second metal welding pad, the third metal welding pad and the fourth metal welding pad are respectively connected to the first connection pin, the second connection pin, the third connection pin and the fourth connection pin by welding.

17. The electronic device according to claim 16, wherein the driving module comprises:

a first driving assembly, wherein the first driving assembly comprises a first acting member and a second acting member, wherein the first acting member is connected to the base, the second acting member is connected to the photosensitive chip module, and the first acting member interacts with the second acting member with magnetism in a first direction to drive the photosensitive chip module to move in the first direction.

18. The electronic device according to claim 17, wherein the driving module further comprises:

a second driving assembly, wherein the second driving assembly comprises a third acting member and a fourth acting member, wherein the third acting member is connected to the base, the fourth acting member is connected to the photosensitive chip module, the third acting member interacts with the fourth acting member with magnetism in a second direction to drive the photosensitive chip module to move in the second direction, both the second direction and the first direction are within a same plane, and the second direction intersects the first direction.

19. The electronic device according to claim 16, wherein the photosensitive chip is mounted on the printed circuit board, the base comprises a baseplate and a side wall surrounding the baseplate, the side wall is connected to an edge of the baseplate, the frame is mounted on the side wall, an installation cavity is formed among the frame, the side wall, and the baseplate, the driving module and the photosensitive chip are located in the installation cavity, and a part of the printed circuit board protrudes out of the installation cavity.

* * * * *